United States Patent [19]
Niriella et al.

[11] Patent Number: 5,133,426
[45] Date of Patent: Jul. 28, 1992

[54] SECURITY SYSTEM

[76] Inventors: Dharmadasa C. Niriella, 46 Ashworth Mansions, Elgin Avenue, London W9 1JP; David J. Stephen, 1 Parsons Street, Adderbury, Oxford OX17 3LX, both of United Kingdom

[21] Appl. No.: 613,903
[22] PCT Filed: Apr. 11, 1989
[86] PCT No.: PCT/GB89/00372
  § 371 Date: Dec. 7, 1990
  § 102(e) Date: Dec. 7, 1990
[87] PCT Pub. No.: WO89/09708
  PCT Pub. Date: Oct. 19, 1989

[30] Foreign Application Priority Data

Apr. 14, 1988 [GB] United Kingdom ............... 8808764
Jun. 9, 1988 [GB] United Kingdom ............... 8813722
Aug. 10, 1988 [GB] United Kingdom ............... 8819003
Mar. 6, 1989 [GB] United Kingdom ............... 8905107

[51] Int. Cl.$^5$ ............................................. B60R 25/00
[52] U.S. Cl. .................................... 180/287; 340/426; 307/102
[58] Field of Search ............... 180/287; 340/426; 307/10.2; 200/10.1

[56] References Cited

U.S. PATENT DOCUMENTS

| 2,868,905 | 1/1959 | Meyer | 200/10.1 |
|---|---|---|---|
| 3,004,170 | 10/1961 | Greenspan | 307/10.2 |
| 3,596,243 | 7/1971 | Leibholz | 340/426 |
| 3,714,628 | 1/1973 | Sloger | 340/426 |
| 3,756,341 | 9/1973 | Tonkowich et al. | 180/287 |
| 3,892,976 | 7/1975 | Tsevdos et al. | 307/10.2 |
| 4,151,509 | 4/1979 | Winiczei | 340/426 |
| 4,175,635 | 11/1979 | Thomas | 180/287 |
| 4,449,605 | 5/1984 | Read | 180/287 |
| 4,546,266 | 10/1985 | Zenick et al. | 307/10.2 |

FOREIGN PATENT DOCUMENTS

| 6010 | 12/1979 | European Pat. Off. . |
|---|---|---|
| 3241071 | 2/1984 | Fed. Rep. of Germany . |
| 3620297 | 9/1987 | Fed. Rep. of Germany . |
| 3613605 | 11/1987 | Fed. Rep. of Germany . |
| 2359732 | 7/1976 | France . |
| 2453056 | 10/1980 | France . |
| 2619163 | 2/1989 | France . |
| 88/03884 | 6/1988 | PCT Int'l Appl. . |
| 2136620 | 9/1984 | United Kingdom . |

*Primary Examiner*—Kenneth R. Rice
*Attorney, Agent, or Firm*—William D. Hall

[57] ABSTRACT

A security system, particularly for a vehicle, comprises an electrical security key usable to make circuits which either directly, or through relays controlling other circuits, render operable electrical devices necessary for the starting of the engine of the vehicle by a conventional ignition key and switch. To confuse a person attempting to breach the security, conductors necessary to supply power to the devices are made discontinous within a wiring loom of the vehicle and other conductors are tapped-in at sides of the discontinuities and extend to relay contacts operable by the use of the key. Further to confuse such person, further conductors are connected to other relay contacts but have no operating function.

15 Claims, 10 Drawing Sheets

SECURITY SYSTEM

BACKGROUND OF THE INVENTION

This invention relates to a security system.

Vehicle thefts are a matter of great concern to their owners, the police forces and to the insurance companies who have to meet the cost of such thefts.

There are currently available various devices which are designed to act as a deterrent to a potential thief.

In existing arrangements it is possible for vehicles to be easily "push-started", 'jump-started' or 'hot-wired' and thus to defeat a system which may have been installed to inhibit ignition from taking place and the engine from being started.

U.S. Pat. No. 3,714,628 discloses a security system which, when applied to a vehicle, or other instrumentality, is intended to prevent unauthorized use of the vehicle or other device on which it is installed, and to prevent tampering with any component attached to the vehicle or device. For this purpose, the conventional cylinder and tumbler locks are omitted and replaced with a multiple contact plug and socket. The plug is associated with a special key unit, coded and matched with a special lock unit associated with the socket, itself associated with a door and/or with an ignition unit. With the special key unit, the owner may lock and unlock the doors and/or boot, start and drive the vehicle, and turn off the ignition, in much the same way as he would use the conventional key. Further, if another key unit or plug, or "jump wiring" is used in an attempt to unlock the doors of the car or to start the engine, an alarm will be initiated to announce that the vehicle or other instrumentality has been tampered with. The system is so constructed as to turn off all the major components, including the ignition, petroleum supply, and electrical current to the various components. The system also includes setting an alarm against motion and unauthorized entry. A serious drawback of the system is that a thief can probe the terminals in its socket with a multimeter to determine which leads are performing which functions in the electrical system of the vehicle, and then connect across the relevant terminals.

GB 2136620 discloses a security system to prevent unauthorised use of a motor vehicle or other device, the system comprising a crystal oscillator circuit with a crystal which is removable for keeping by an authorised user, the crystal defining the frequency of oscillation of the oscillator circuit, a filter circuit tuned to the frequency of the oscillator circuit, and some means disabling the device against operation except upon receipt of a signal from the oscillator circuit via the tuned filter circuit when the crystal is inserted in the oscillator circuit.

The disabling means includes a relay having three changeover switches, of which one is employed for internal latching, the second is employed to maintain a bonnet lock solenoid energized in the absence of the crystal and the third is employed to cut the power to the ignition coil and instead applies it to the horn for alarm purposes, until the key is inserted, whereupon the power is transferred to the ignition coil. The system interrupts the power supply to only one device essential to the starting of the engine, namely the ignition coil at its positive side, so that the engine can be relatively easily jump-started by running a jump lead from the battery positive terminal to the ignition coil positive terminal. Although the horn would be sounded upon such jump-starting, a thief would simply sever the power supply to the horn. Therefore the only happening which would alert, for example, a policeman to the fact that the vehicle was being stolen would be the horn sounding and this could be for only a very short time.

U.S. Pat. No. 4,278,963 discloses a system similar to that of GB 2136620 except that the secure control means consists of an additional mechanical key and a combination thumbwheel switch arrangement and that, instead of interrupting the power supply to the ignition coil it interrupts the supply to the starter solenoid.

The interruption of the supply to only the starter solenoid has the serious disadvantage that the vehicle can be push-started.

U.S. Pat. No. 4,546,266 describes a security system in which an electrical circuit, the starting circuit for a motor vehicle for example, is selectively enabled by a control circuit which includes a magnetic field responsive switching device. Proper positioning of a magnet which provides a field of the appropriate polarity and strength relative to the switching device results in the energization of a relay which has contacts connected in series with the circuit being controlled. In the motor vehicle application, operation of the ignition switch within a pre-determined time subsequent to removal of the magnet will latch the relay in the energized state. The system is relatively insecure in that a thief either arrives provided with another suitable magnet or traces the wiring to the magnetically operated switching device and bypasses the device, and in that it interrupts the power supply to the starter relay, so that the vehicle can be push-started. Another security weakness is the utilization of a "service" plug, thus increasing the opportunities open to a potential thief.

SUMMARY OF THE INVENTION

According to a first aspect of the present invention, there is provided a security system, comprising electrical control circuitry, a plurality of electrical devices connectible to said control circuitry for operation thereby, electrical conductors, at least one being included in said control circuitry and extending to an interruption location where said conductors terminate and others extending from said interruption location to said electrical devices, secure control means usable at said location to connect said at least one to said others individually, characterized in that one or more further electrical conductors having no operating function are arranged among at least some of the first-mentioned conductors in the manner of a wiring loom.

The provision of these further electrical conductors makes it more difficult for a person attempting to breach the security to ascertain by trial-and-error the individual functions of the various conductors in the system.

According to a second aspect of the present invention, there is provided a security system, comprising electrical control circuitry, a plurality of electrical devices connectible to said control circuitry for operation thereby, electrical conductors, at least one being included in said control circuitry and extending towards an interruption location where said conductors terminate and others extending from said interruption location towards said electrical devices, secure control means usable at said location to connect said at least one to said others individually, characterized in that at least one of said first-mentioned conductors has a discontinuity therein, and tapped-in conductors are connected to respective opposite sides of the discontinuity and are arranged among at least some of the first-mentioned conductors in the manner of a wiring loom.

The provision of these tapped-in electrical conductors again makes it more difficult for a person attempting to breach the security to ascertain the individual functions of the various conductors in the system.

According to a third aspect of the present invention, there is provided a security system comprising electrical control circuitry including relay means comprising driving means and a plurality of individual switching means openable and closable by energization and de-energization of said driving means, a plurality of electrical devices connectible to said individual switching means, characterized in that any one of said plurality of electrical devices is operatively connectible to any one of all of the individual switching means operable by said driving means.

The arrangement whereby any one of the devices is operatively connectible to any one of the switching means increases the number of security permutations available compared with an arrangement whereby each switching means is dedicated to a particular device.

The present system has a wide variety of fields of application, but is particularly applicable to motor vehicles.

According to a fourth aspect of the present invention, there is provided a vehicle security system, comprising principal electrical circuitry, which can be completed electrically by use of secure control means, thereby to render said principal electrical circuitry ineffective as security, secondary electrical circuitry, an accessory, e.g. a vehicle horn, electrically connected to said secondary electrical circuitry for operation thereby, and relay means interposed between said principal electrical circuitry and said secondary electrical circuitry and operable upon completion of said principal electrical circuitry to close said secondary electrical circuitry, characterized in that said secondary electrical circuitry includes a supply line separate from a supply line of said principal electrical circuitry, and that a plurality of accessories selected from windscreen wiper motors, exterior lamps and a horn are electrically connected to said relay means by way of said secondary electrical circuitry.

With this arrangement, even if a thief manages to start the engine and drive away the vehicle, he is unlikely to be able also to render operable the windscreen wiper motors and/or exterior lamps (such as the headlamps, sidelamps, trafficators, and/or brake lamps), so that a policeman may well notice the failure of these accessories to operate.

According to a fifth aspect of the present invention, there is provided a vehicle security system comprising an electronic device for controlling an engine, sensing means for sensing states of said engine, and conductor means extending between said sensing means and said electronic device, characterized in that said conductor means extends between said sensing means and said electronic device by way of an interruption location, and in that secure control means is usable at said location to enable said sensing means to transmit signals to said electronic device by way of said conductor means.

This arrangement yet again puts an obstacle in the way of a thief attempting to start the engine.

The secure control means can take various forms but is advantageously an electrical or electronic key.

Owing to the present invention, it is possible to provide an anti-theft device for a vehicle, the electrical circuits of which device cannot be by-passed from within the driving compartment of the vehicle. Moreover, it would be extremely difficult for a potential thief to start the engine from within the engine compartment, without effectively re-wiring, for which activity there would normally not be sufficient time. The device therefore provides a very effective deterrent against vehicle theft.

The device may comprise a series of linked electromagnetic relays or solid state on/off switching devices, with contacts whose arrangement may be varied, contained within a suitable housing and arranged such that, in the absence of electrical power, they are either in normally 'open' or normally 'closed' conditions. The housing may be integral with the dashboard or control panel of the vehicle or attached at any convenient point within the driving compartment or behind the dashboard or control panel.

The relays can only be activated or caused to change their mode from 'open' to 'closed' and vice versa when the electrical link circuit among them is completed by the insertion of a coded electrical key, particularly a coded electronic key.

The sequence of the electrical circuits in the anti-theft device may be varied from anti-theft device to anti-theft device to provide variations in type. The key may be flat and with one end formed in the plane of the key so as to provide various coded configurations to give further security in that a particular key configuration will only fit into a matching housing.

The key may also have an aperture or series of apertures which can be positioned in any part of its plan area to provide a further, vertical coded configuration which will allow a light beam to pass through it or them from, for example, a light emitting diode to a light-dependent resistor to further complete the electrical circuit. The key can be male in form and designed to be inserted into a female housing which has matching configurations in both its plane and a plane perpendicular thereto. When the housing is provided with electrical power via the insertion of the key, then the circuit is completed through the light emitting diode, the light dependent resistor and the additional contacts in the plane of the key provided that they match exactly. The electrical circuit thus completed by the key then transmits power to the electro-magnetic relays or solid state on/off switching devices contained within the housing and causes them to open or close to perform their prescribed function of supplying continuous electrical power to the various components of the engine to cause ignition to take place and the engine to function and continue to do so.

In a conventional situation, the power needed to start the engine of a vehicle is provided by the vehicle ignition key being inserted into the ignition lock of the vehicle and turned to the 'on' or 'contact' position for it to start. In this present situation, the normal ignition system is interrupted by the electro-magnetic relays or solid state on/off switching devices contained within the anti-theft housing and, until such time that the anti-theft key is inserted, the circuit will not be completed and the engine will not start.

Therefore, in the absence of the anti-theft key, a potential thief will not be able to start a vehicle fitted with the housing unless he is able to duplicate the configurations of the anti-theft key or has the time required to re-arrange the wiring of the vehicle to cause it to start, which could only be achieved with extreme difficulty.

The electrical power needed to complete the circuit and activate the light emitting diode and the light dependent receiver can be provided automatically from the battery of the vehicle and when the key is inserted the circuit is completed. The power thus provided could, for example, cause a solenoid or similar electrically powered locking mechanism to be activated and provide a means of being able to open or close the door of a vehicle and secure it in such manner that it would not be possible to open it without the key, other than by force. Substantial additional security can thereby be provided.

All of the electrical connections to the vehicle components in question, such as the ignition coil, the distributor and the fuel valve, in the case of a petrol internal combustion engine, may be contained within a ribbon of wires, sealed at the terminal ends within the housing, and the sequence of wires as they connect to the various components may be varied from anti-theft device to anti-theft device and the connections to and from the various components of the engine may be made by soldering them within the ribbon so as to make them virtually undetectable and taped up to simulate the original loom.

In another embodiment of this invention, the electrical connection carrying the ignition switch current to the positive side of the ignition coil passes through both the housing and the key of the anti-theft device.

Consequently, unless the key is connected to the housing when the ignition current is switched on, electrical power will not be transmitted to the positive terminal of the ignition coil and the engine will not start.

In addition to the line which carries the ignition switch current to the ignition coil positive terminal, the housing and the key are arranged to carry the following main connections to other vital components which have to be electrically powered for the engine to start and to continue to run:

1. From the coil negative terminal to the distributor.
2. From the distributor to an electronic ignition module or engine management system (if one is fitted).
3. From the battery positive line to an alarm system or systems which may be incorporated.
4. From the ignition line to the fuel pump where the engine is fitted with an electrically powered pump. In cases where the engine is fitted with a mechanical pump a fuel cut-off valve which is operated by an electrically powered solenoid may be connected additionally into the fuel line.
5. To an earthing point for the complete system or to any other electrical components or parts which may need to be isolated to provide additional security.

Again, unless the key is connected to the housing when the ignition current is switched on, the vital components which would normally cause ignition to take place and the engine to run will have been isolated.

Therefore, by arranging the wiring of an engine in such manner as to make provision for the anti-theft housing and key, an extremely effective deterrent against theft of a vehicle in which the engine is installed will have been provided because, in the absence of the anti-theft key, a potential thief will not be able to start the engine even if he is in possession of a duplicate set of ignition keys.

The system is designed to have its housing installed in the driving compartment of the vehicle or other convenient location of the vehicle and either fitted as an 'add-on' or incorporated as part of the original wiring loom when the vehicle is built.

Consequently, installation of the housing within the driving compartment means that it will be impossible to 'hot wire' from within the driving compartment in the normal way by joining the ignition wires because these will have been interrupted by the housing along with other essential circuits.

Equally, any vehicle so fitted could only be 'hot-wired' from under the bonnet with extreme difficulty and by effectively re-wiring the engine, for which activity, within the context of vehicle theft, there would not be sufficient time, for the following reasons:

(i) the wires or connections coming from or going to the housing are randomly arranged within the loom of the vehicle so that they cannot be easily identified. Further, and because the wires or connections are so arranged, it will not be possible for a potential thief to be able to readily identify the connection sequence to allow him to 'hot-wire' the vehicle by, for instance, connecting the battery positive to the ignition coil positive, because the connection between these two will have already been interrupted at the housing and also because, even if he were able to find these two and make a connection, it would still be necessary for him to locate the other wires leading to the vital components for him to be able to complete the sequence and start the vehicle in the absence of the anti-theft key.

(ii) the housing is provided with a number of wires which may exceed that number required to connect to the vital components. These excess wires may be used as earth wires for the system whilst the others may remain un-used or for linking to additional security devices which may be specified. The sequence of wires which are used to connect to the various components cited may, together with the un-used or earth wires, be varied such as to provide a very large number of permutations within the system so as to make the sequence of connection to the components on any given vehicle virtually un-detectable.

(iii) additional anti-theft security is provided by the fact that only two wires emanating from the housing could be identified using test equipment—these two wires being the battery positive wire and the ignition current wire. All of the other wires emanating from the housing are at zero potential. These wires are the earth wires and those going to, for example, the ignition coil negative terminal, the distributor, and the electronic management system (if fitted).

Therefore, if by mistake the potential thief were to connect the ignition wire to any wire at zero potential other than to the right one then the ignition line fuse provided in the vehicle will fuse and cause it to be totally immobilised.

Likewise, if the potential thief were to connect the battery positive connection to any wire at zero potential, the fuse provided in the battery line of the system will fuse. This will mean that there will be no live current derived from either the ignition or battery source present at the face of the housing and the whole system will be inert and the vehicle totally immobilised until such time as the fuse is replaced.

(iv) in some versions the anti-theft key is provided with a means of linking the sequence of wires or connections which extend from or to the housing and the means of linking can be varied to match the selected sequence within the housing.

The wires extending from the housing to the vital components can be connected to the components with the variations being incorporated within the housing, instead of within the ribbon.

In order that the invention may be clearly understood and readily carried into effect, reference will now be made, by way of example, to the accompanying drawings, in which:

BRIEF DESCRIPTION OF THE DRAWINGS

DETAILED DESCRIPTION OF THE INVENTION

Figure 1:
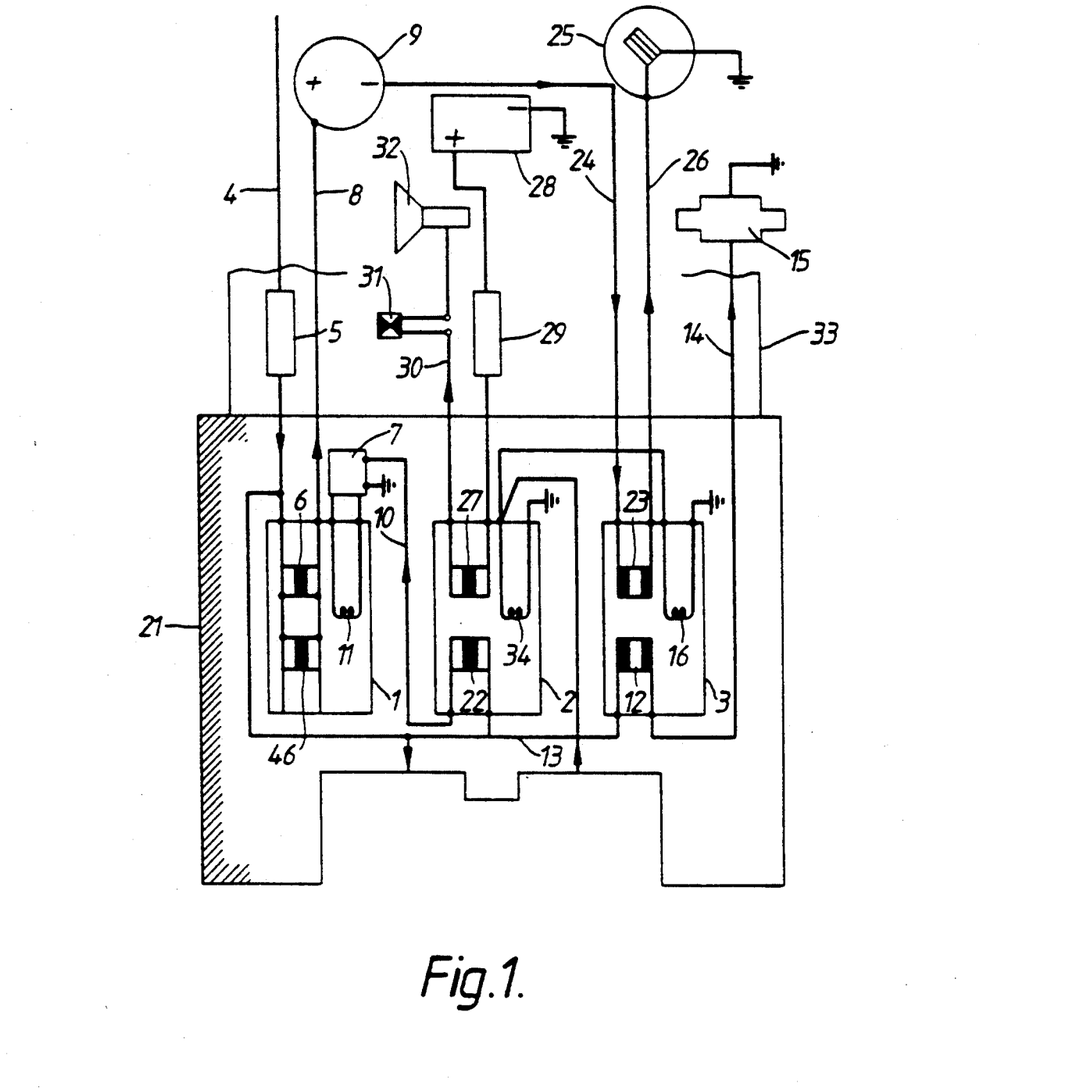
FIG. 1 is a diagram of part of an electrical system of a petrol, spark-ignition, internal combustion engine of a motor vehicle and including a main portion of an anti-theft device, the system part being shown in its condition prior to receiving electrical power from an ignition switch.

Referring to FIG. 1 of the drawings, a wire 4 carries the current from the ignition switch (not shown) through an in-line fuse 5 to normally closed contacts 6 of an electro-magnetic relay which is linked to an electronic timer module 7 through normally closed contacts 22 of an electro-magnetic relay 2 and through an electrical conductor 10.

The current from the wire 4 passes through both sets 6 and 46 of normally closed contacts of the relay 1 (which are connected in parallel) through a wire connection 8 to the positive switch terminal of an ignition coil 9.

The contacts 6 are normally closed when the ignition current is switched off but, with the ignition in the 'on' or 'contact' condition, they are caused to open after an adjustable pre-set delay time because the ignition current is also simultaneously connected through the normally closed contacts 22, thereby transmitting power to the electronic timer module 7 which, after the time delay, will energise the solenoid 11 of the relay 1, thus causing the closed contacts 6 and 46 to open.

This action interrupts the ignition current to the positive terminal of the ignition coil 9.

In addition, ignition current is simultaneously connected to one set of normally open contacts 12 of a relay 3, via a connection 13. These normally open contacts are connected by a wire 14 to a fuel flow inhibiting valve 15, which may be of any suitable type, which valve will be caused to open and supply fuel when electrically energised. However, until such time as electrical power is supplied to the solenoid 16 of the relay 3, thereby causing the normally open contacts to close, electrical power will not be transmitted to the valve 15 and, again, the engine will not run.

Figure 2:
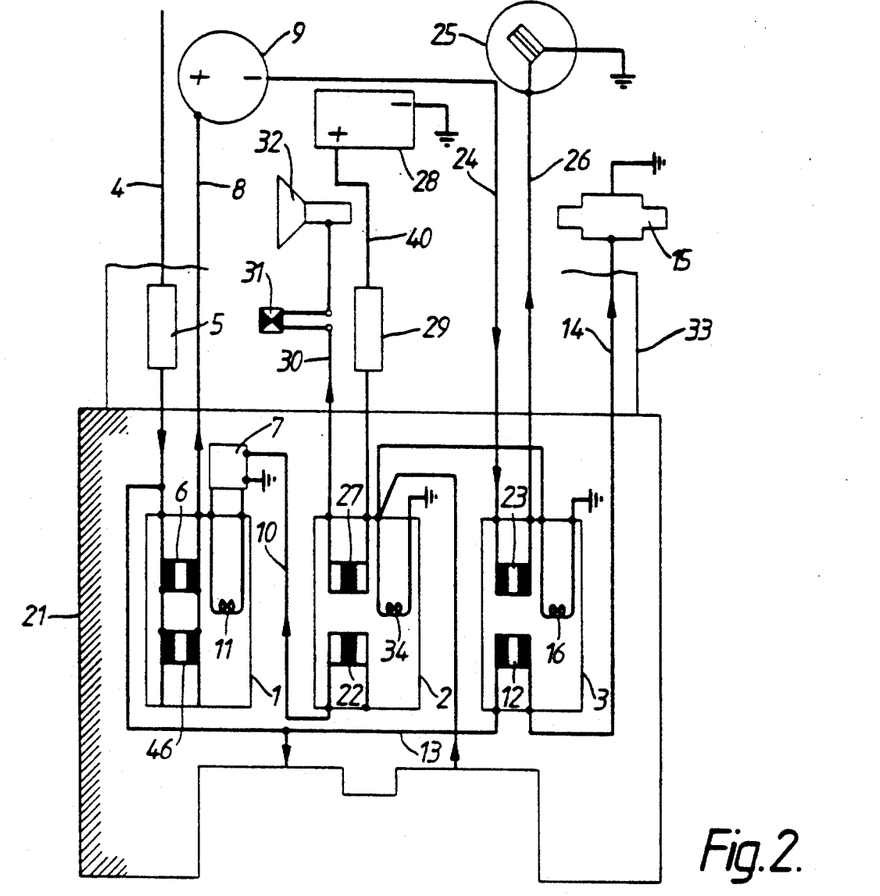
FIG. 2 is a diagram similar to FIG. 1, but showing the system part in its condition immediately after it has received power from the ignition switch.
Figure 3:
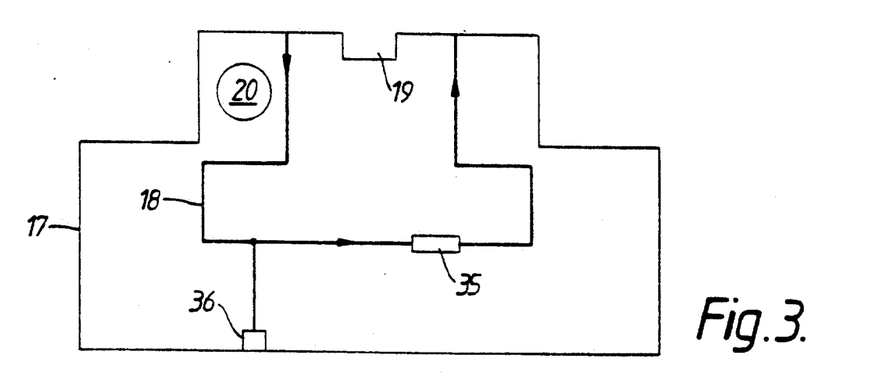
FIG. 3 is a diagrammatic plan view of a key portion of the anti-theft device.

FIG. 2 shows the states of the relays 1 to 3 after the ignition has been switched to 'on' or 'contact' and immediately after the timer module has energised the solenoid 11, thus opening the contacts 6 and 46, and in the absence of the key portion 17 shown in FIG. 3.

FIG. 3 illustrates, in plan, a simplified example of the key portion 17 including a circuit part 18 which incorporates a resistor 35 and which may incorporate a light emitting diode 36 to give a visual indication that a circuit through the part 18 has been completed when the portion 17 has been inserted into the main portion 21. The key portion 17 includes coded configurations 19 formed in its end intended to be inserted and also an aperture 20 which will allow a light beam to pass through it from a light source in the form of a light emitting diode to a light dependent resistor (both of which are not shown but may be incorporated with-in the main portion 21).

Figure 4:
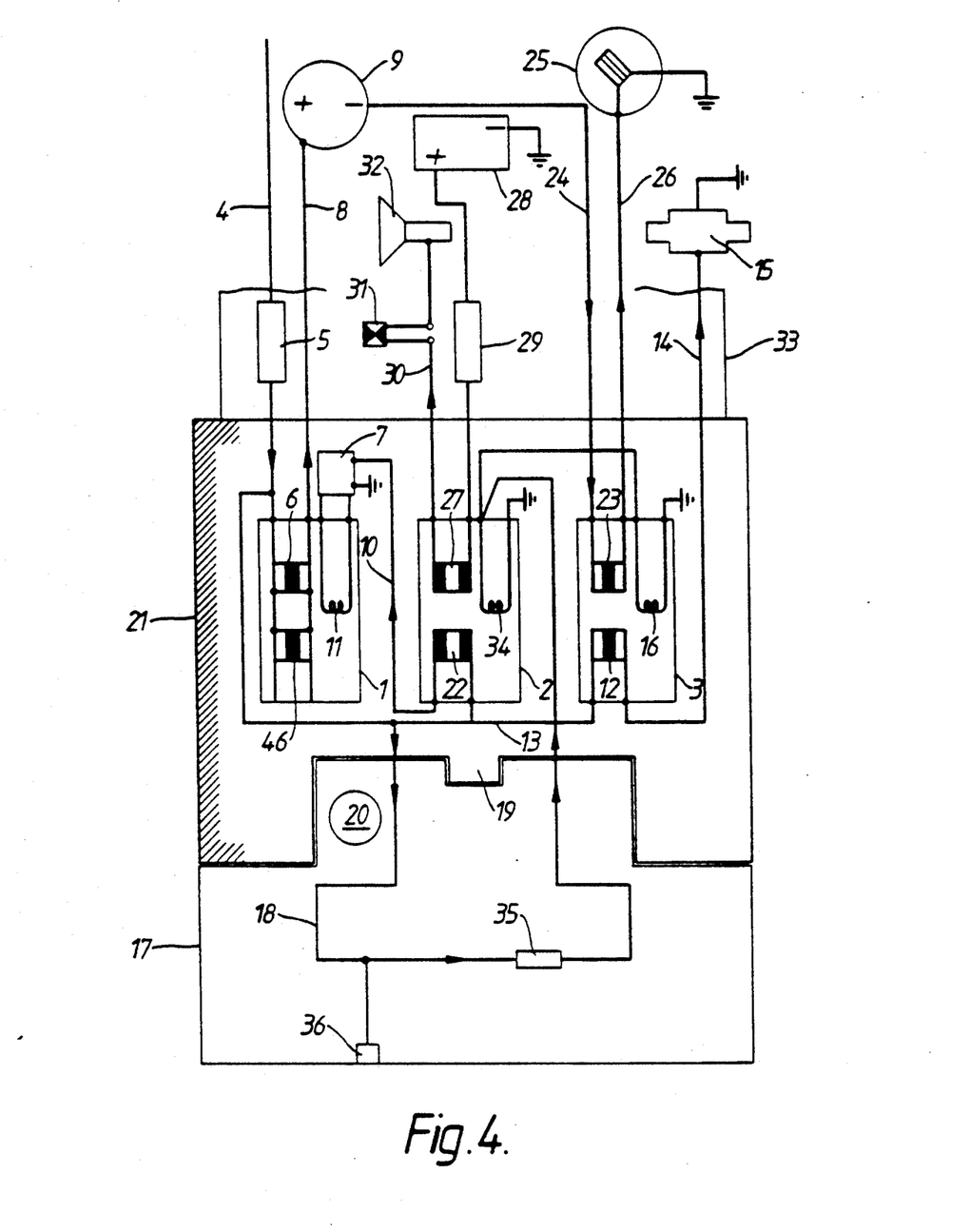
FIG. 4 is a diagram similar to FIG. 2, but showing the system part in its condition with the key portion inserted into the main portion.

FIG. 4 illustrates in plan the key portion 17 in position within the main portion 21. The key portion 17, once in position, completes the electrical circuit to the solenoids 16 and 34 of the relays 3 and 2. Consequently, the normally closed contacts 22 now remain open because the solenoid 34 is being continuously energised. Therefore, current will not be transmitted to the timer module 7, which action prevents the normally closed contacts 6 and 46 from opening and therefore ensures a continuous current flow to the ignition coil of the vehicle.

Insertion of the key portion 17 also simultaneously energises the solenoid 16. Therefore, the normally open contacts 12 will now remain closed and ensure supply of power to activate the fuel valve 15 via the wire 14.

There is a further set of normally open contacts 23 within the relay 3. A wire 24 extends from the negative terminal of the coil 9, to the contacts 23 and a wire 26 extends from the contacts 23 to a distributor 25.

Again, in the absence of the key portion 17 to complete the circuit and thus without power to close the contacts of the relay 3, these contacts will remain open, thus preventing power supply to the distributor 9.

Within the relay 2 there is provided a second set of normally closed contacts 27 to complete a circuit from the positive terminal of a battery 28 via a wire 40, an in-line fuse 29 and a wire 30 to (for example) a bonnet tilt switch 31 and thence to an electric horn 32, or other audible alarm device which may be fitted to the vehicle.

These normally closed contacts 27 remain closed until such time as the key portion 17 is inserted to complete the circuit. In the absence of the key portion 17, if the bonnet is opened the alarm will sound because power would be supplied to it directly from the battery positive terminal. This audible warning would tend to deter a prospective thief from trying to investigate further and/or attempting to disconnect or disarm the system.

All of the wires 4, 8, 14, 24, 26, 30 and 40 which come from the main portion 21, which may comprise a housing in which the contents are potted in resin, are contained with-in a ribbon 33 of wires, such as that which is used for multiple connections to computers and the like. The ribbon is preferably flat in section and arranged such that the wires selected from within it which connect to the various components can be varied from anti-theft device to anti-theft device to provide further security within the system, in that it would not be readily apparent where the connections terminated or which were connected to the various relays within the housing.

Further the ribbon 33 is arranged such that all of the terminals are sealed within the housing so that access cannot be gained to them other than by cutting through them, which action would blow the security fuses provided and thereby prevent an excessive heat build-up through the system having been short circuited. Such an act would, in any event, immobilise the vehicle completely.

Also, the connections which are made to and from the various components of the engine would be made within the length of the ribbon 33 and, once properly soldered, the whole would be formed into a tube and wrapped around the normal wiring loom of the vehicle or incorporated within it and overtaped with insulating material in such manner as to be totally concealed. Any one of the wires which is not employed within the ribbon can be used as an earthing wire or several of them can be joined together for the same purpose.

In the case of a Diesel-powered vehicle which does not have an ignition coil or a distributor, it is only necessary to make connection to the fuel pump which, again, will be immobilised in the absence of the key portion 17.

Instead of the relays 1 to 3 it is possible to employ solid-state switches. A disadvantage of such components, with or without moving parts, is that they are more liable to fail than are wires.

Figure 5:
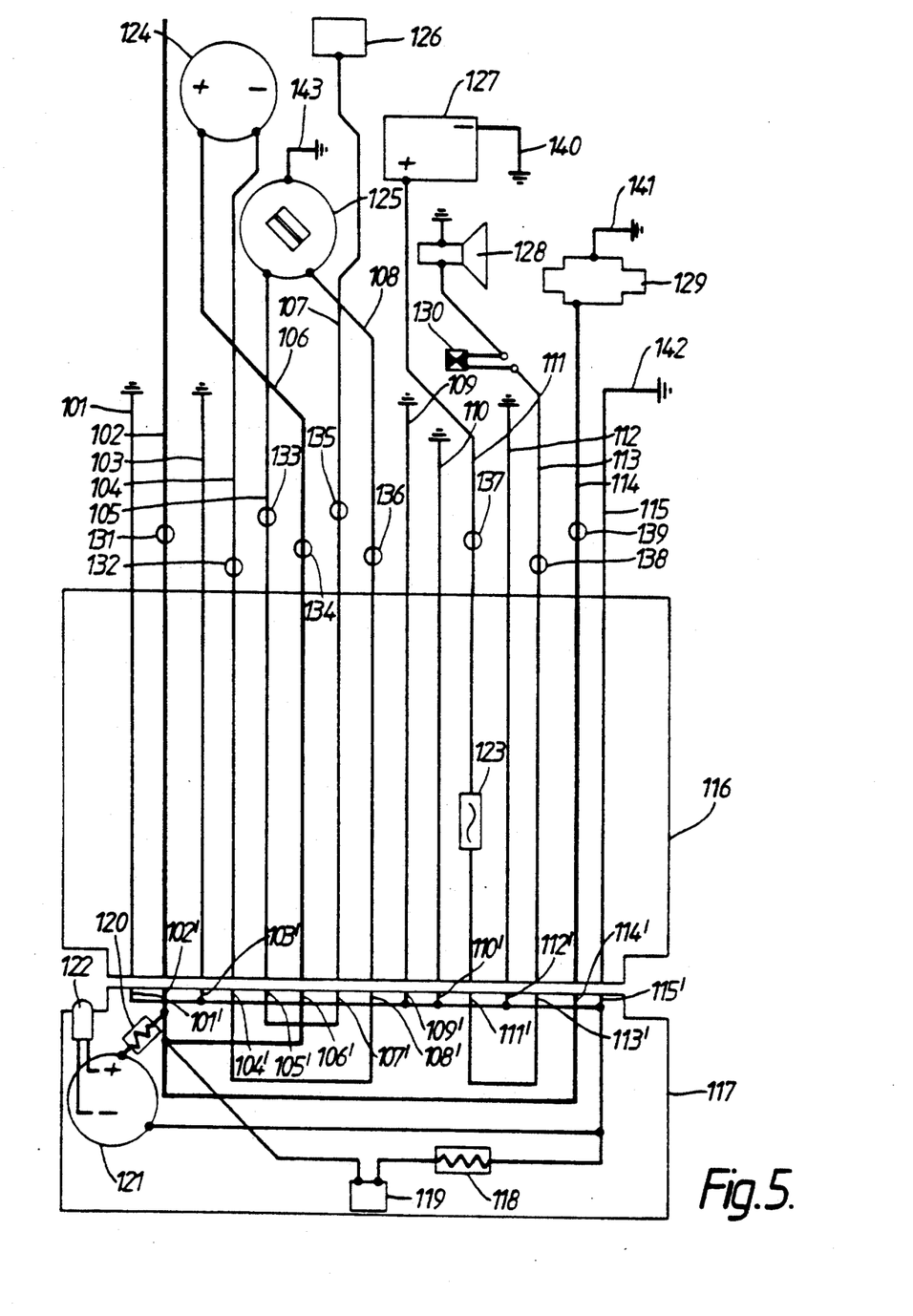
FIG. 5 is a diagram of the system part including a modified version of the anti-theft device and illustrating one of a multiplicity of possible wiring sequences.
Figure 6:
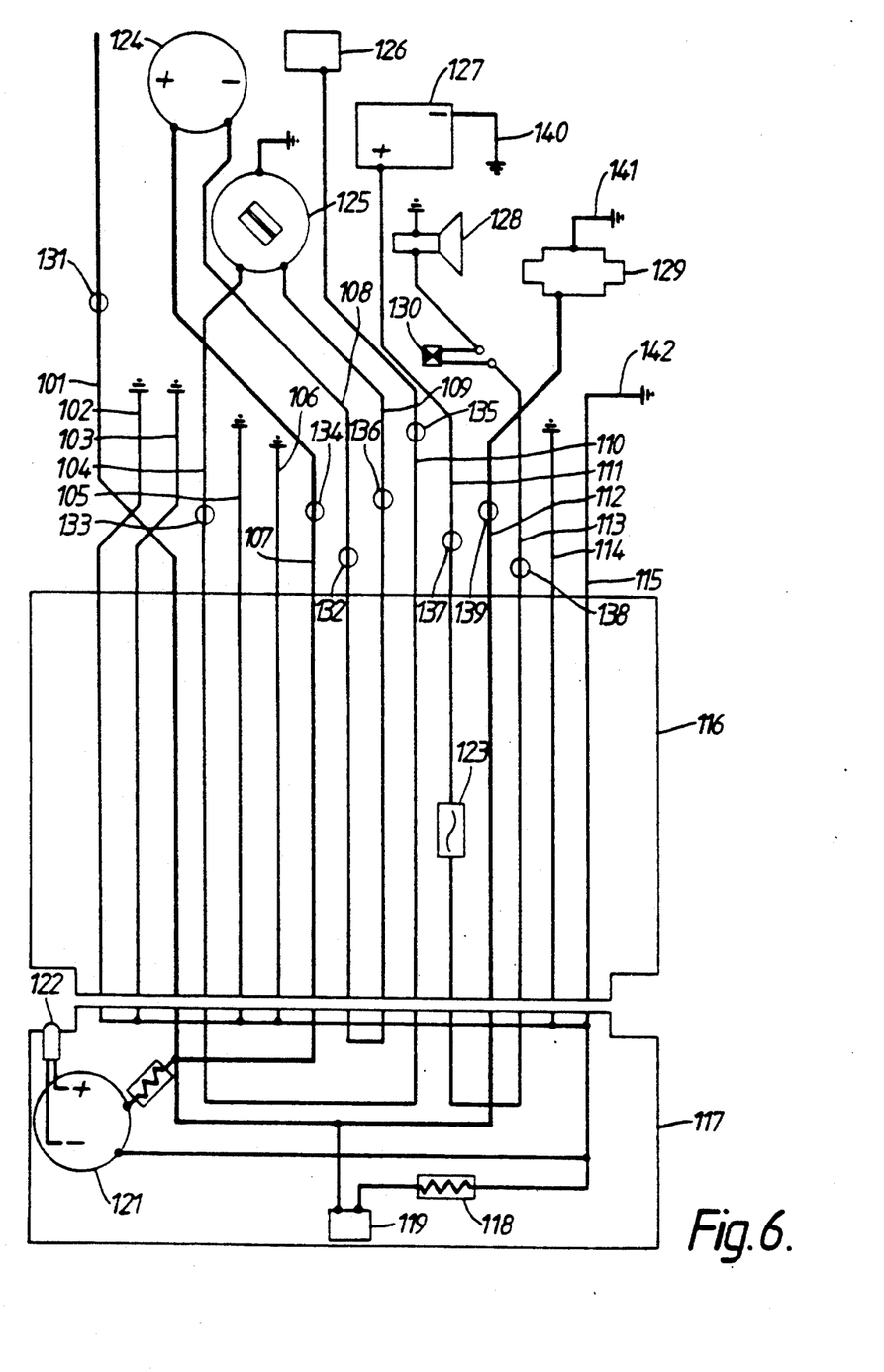
FIG. 6 is a diagram similar to FIG. 5, but illustrating another of the possible wiring sequences.

FIGS. 5 and 6 disclose a version in which such components are omitted from the anti-theft device and instead the hidden complication of the wiring is more heavily relied upon to give the required security.

FIG. 5 shows the wires and connections which either are part of the loom where fitted as original equipment to a vehicle or are added to an existing loom.

The lines 101 to 115 and 101' to 115' denote the wires or connections—including earthing and un-used wires—which extend from or are attached to the main portion 116 of the anti-theft device and the key portion 117. The portion 117 houses a resistor 118 and a light emitting diode 119 connected in series with each other, but not in series with the ignition coil 124, the distributor 125, an electronic module or engine management system 126, the battery 127, the sonic alarm device 128 and the fuel valve 129, so that failure of the component 118 or 119 does not affect operation of these other items. The portion 117 further includes a resistor 120, a rechargeable battery 121 and a miniature lens bulb 122 again connected in series with each other but not with those other items. An in-like fuse 123 is provided within the system to protect the vehicle against fire in the event that the system is 'short-circuited' inadvertently by a potential thief trying to break into it and contacting the wrong connections.

The small circles numbered 131 to 139 indicate random soldering or joining points for the wires where they are to be joined to those in an existing loom and the numbers 140, 141, 142 and 143 indicate further earthing points for various components.

In the wiring sequence shown, the positive terminal of the ignition coil 124 is connected via the wire 106 to the ignition switch wire 102 and the valve 129 through the wire 114.

The negative terminal of the ignition coil 124 is, in turn, connected via the wires 104 and 108 to the distributor 125.

The distributor 125 is, in turn, connected via the wires 105 and 107 to the electronic module or engine management system 126.

The battery 127 is connected via the wires 111 and 113 to a tilt switch 130 which activates the sonic alarm device 128.

The wires 101, 103, 109, 110, 112 and 115 represent earthing or 'unused' wires which can be used to expand the system further if so desired but in any event are provided as surplus to actual requirements to allow a high degree of random selection to be built into the system and by so doing provide for the maximum possible number of variations.

All of the linkages among the components 124 to 130 are terminated at the front face of the housing 116 and the circuits then completed within the key 117 as shown.

As previously stated, this arrangement provides a high degree of security against theft of a vehicle and, in the absence of the key 117 it would be virtually impossible to break into the system and link all of the interdependent connections in the correct sequence to cause ignition to take place and for the engine to work.

FIG. 6 shows the same arrangement of components of the engine but connected in a different wiring sequence to the housing 116 and thence to the key 117 and serves to illustrate how the system can be varied so as to provide additional security through variations in the installation sequence and allocation of connections. The coil 124 is connected to the wires 107 and 108, the distributor 125 to the wires 107 and 109, the module or system 126 to the wire 110, the battery 127 to the wire 111, the switch 130 to the wire 113, the valve 129 to the wire 112, and the wires 102, 103, 105, 106, 114 and 115 to earth.

In the versions so far described with reference to the drawings maintaining good electrically conductive contact between the terminals of the main portion 16 or 116 and the terminals of the key portion 17 or 117 could be an increasing problem with increasing age of the device, particularly with increasing wear. To mitigate this problem, the currents required to be carried by those terminals can be reduced to the order of microamps by the use of initiating circuitry between the key portion and the circuitry carrying the full electrical load. Such a version will now be described with reference to FIG. 7, in which between an electronic key portion 217 and an amplifier 250 is electrically connected initiating circuitry 251 consisting of key identifying and accepting circuitry comprising a digital comparator. The key portion 217 is insertable into a socket 252 from which flying lead 253 in a wiring ribbon extend into a main portion 216. In the latter portion is a coil 254 and four contact sets 255 to 258 of a four-pole changeover relay, the coil 254 being connected to the output of the amplifier 250 for energization in response to an output signal from the circuitry 251 in the event that the correct key portion 217 is inserted and the ignition key switched on. The contact sets 255, 256 and 257 are normally open and the contact set 258 is normally closed. A wire 259 from the positive terminal of the battery is directly connected to the amplifier 250 for energization of a sound warning device 260 in the event that the key portion 217 is left in the socket 252 when the ignition is switched off. This is intended to remind the driver to take his key portion 217 with him. Also connected to the amplifier 250 is the ignition switch wire 204 and an earth wire 261. The positive terminal of the battery is also connected through a wire 262 containing the mercury tilt switch 231 and the siren 232 to the normally closed contact set 258 and thence to the wire 261. Two earthed dud wires 263 and 264 are interposed between the wires 261 and 262. Two wires 265 and 266 are connected to the normally open contact set 257 and can be connected across a cut wire between the distributor and an electronic ignition module (if provided). The normally open contact set 256 is connected to wires 267 and 268 connected to the distributor points and the contact breaker terminal of the ignition coil, with two earthed dud wires 269 and 270 being located between them. The normally open set 255 connects the wire 204 to three wires 271 to 273. The wire 271 is connected to the switch terminal of the ignition coil; the wire 272 to the power line to the electrical fuel pump (if provided) or (if not) to the solenoid-operated fuel cut-off valve; and the wire 273 to ignition-controlled accessories, such as wiper motors.

Figure 7:
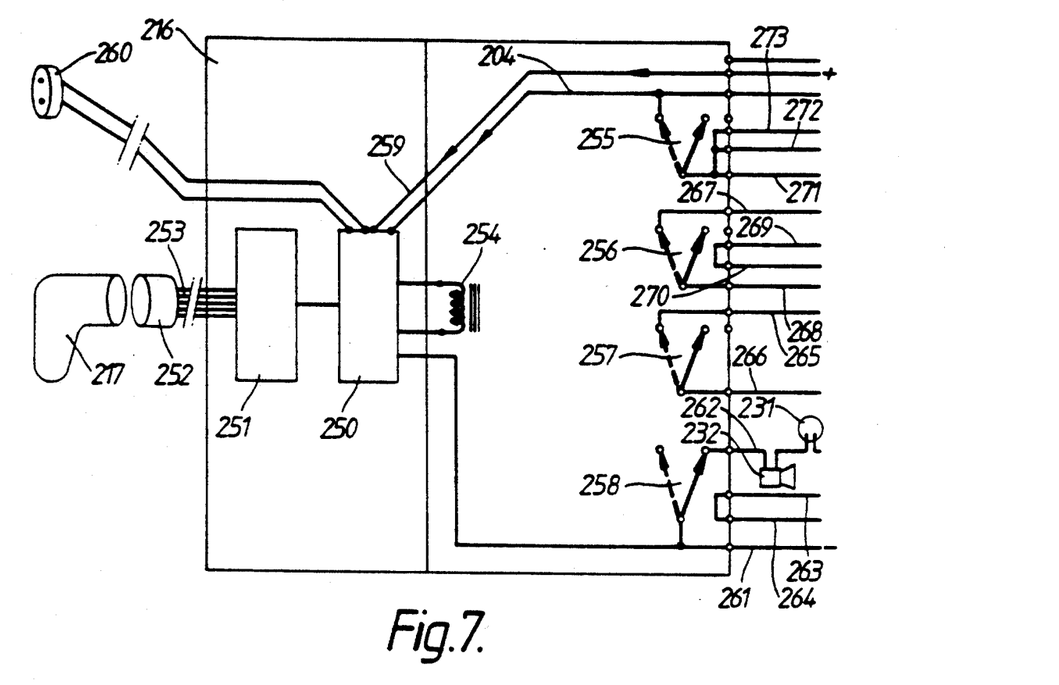
FIG. 7 is a diagram similar to FIG. 1, but of another modified version of the anti-theft device.

In operation of the device shown in FIG. 7, upon switching on the ignition, current is supplied to a solid state electronic system consisting of the key 217 the conductors in which contain resistors of selected values; the key identification and vertification and key command acceptance module 251; and the amplifier module 250 which powers a transistor to switch on and transmit current in a latched phase to the coil 254 of the 4-pole relay. Again, all of the wires 204 and 261-273 are buried in a taped wiring loom, to make it even more difficult for a thief to start the engine.

The resistors in the key 217 may be four in number and may be identical to, or different from, each other in value. For insertion of the key to result in energization of the relay coil 254 upon switching-on of the ignition, the four resistors in the key must match four resistors provided in the digital comparator in the circuitry 251. Since resistors can vary in value between zero ohms and several million ohms, hundreds of thousands of combinations are available.

Again, to increase security further, the sequence of entry of the flying leads 253 into the resin-pot housing 216 can be varied from device-to-device, as can the sequence of entry of the wires 204 and 261-273 into that housing.

Figure 9:
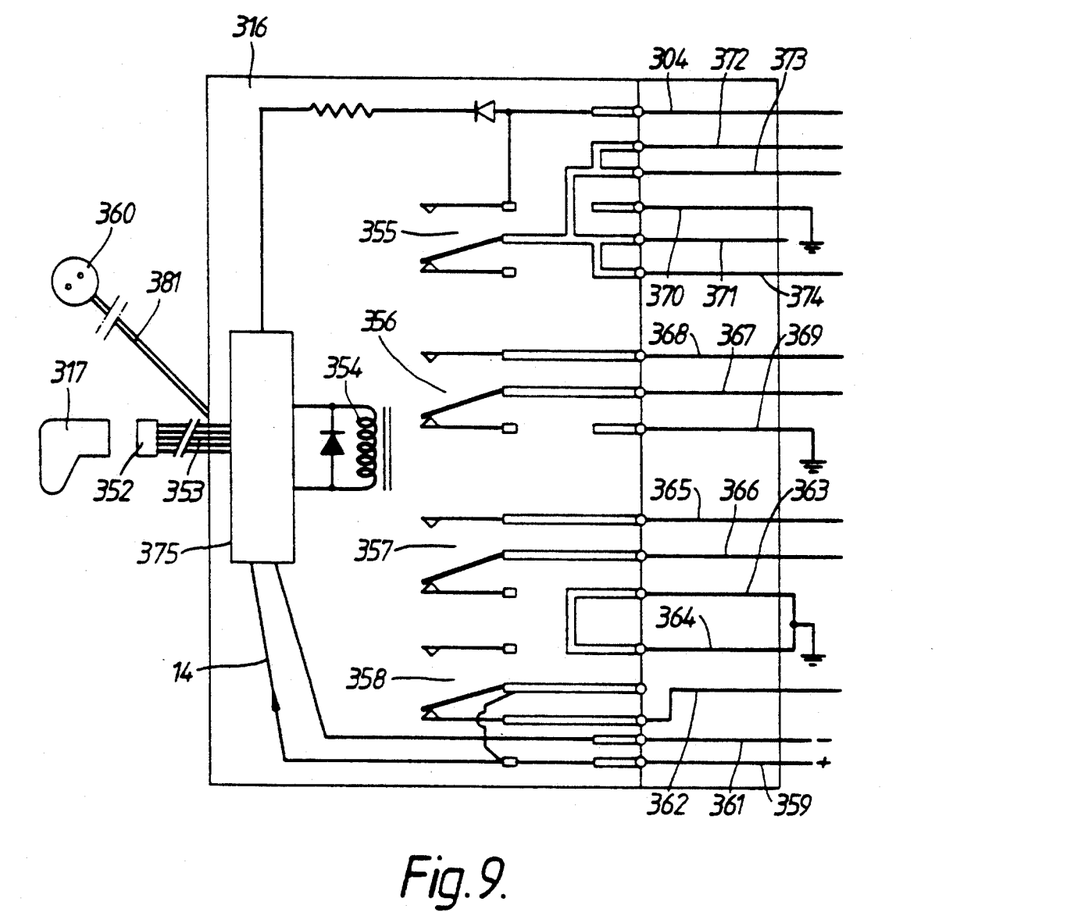
FIG. 9 is a diagram similar to FIG. 1, but of a further modified version of the anti-theft device.
Figure 10:
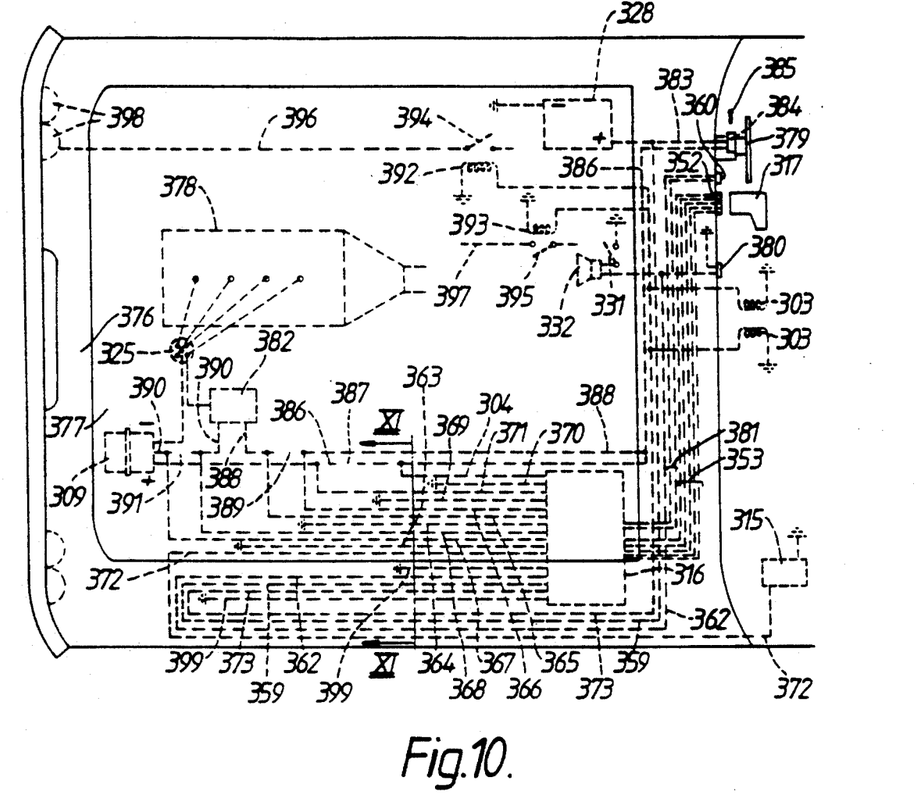
FIG. 10 is a fragmentary, diagrammatic top plan view of the motor vehicle with that further modified version.
Figure 11:
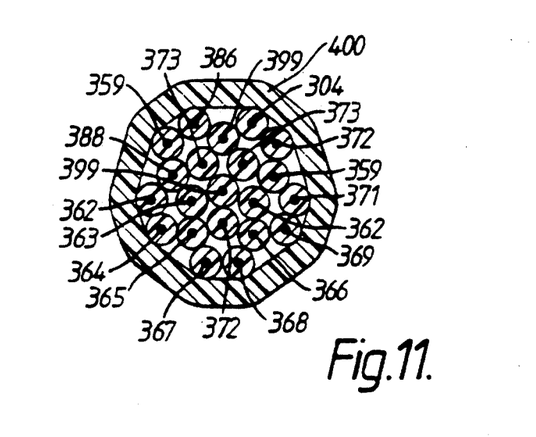
FIG. 11 shows a section taken on the line XI—XI in FIG. 10.

Referring to FIG. 9 to 11, the items 304, 316, 317, and 352 to 373 correspond respectively to the items 204, 216, 217, and 252 to 273 in the version of FIG. 7. An extra wire 374 is provided serving a similar purpose to that of the line 273. The item 375 is a hybrid chip which effectively performs the functions of the amplifier 250 and the circuitry 251 in FIG. 7.

Referring to FIGS. 10 and 11, the motor vehicle 376 has a bonnet 377 liftable to give access to an engine compartment containing a spark-ignition, petrol, internal combustion engine 378. Within the passenger compartment are seen a steering wheel 379, an electronic key portion 317 and its associated socket 352, a sound warning device 360 and a light emitting diode (LED) device 380 which is connected in the wire 362 and which indicates that the anti-theft device is effective. The device 380 is provided because otherwise there is nothing to enable a user to distinguish between the effective condition of the anti-theft device and a condition where there is no power supply available, for example because of a faulty connection to the battery 328 in the engine compartment. The engine compartment may also contain the main portion 316 connected by flying leads 353 to the socket 352. The device 360 is connected by leads 381 to the main portion 316. A wire 383 extends from the positive terminal of the battery 328 to an ignition switch 384 closable by insertion and turning of an ignition key 385. A wire 386 leads from the switch 384 towards the positive terminal of an ignition coil 309 in the engine compartment. However, the wire 386 is interrupted at 387 and the wires 304 and 371 are tapped into the wire 386 at respective opposite sides of the interruption 387. Tapped into the wire 386 at a location between the switch 384 and the interruption 387 is a wire 388 leading towards an electronic ignition module 382 in the engine compartment. However, this wire is interrupted at 389 and the wires 365 and 366 are tapped into the wire 388 at respective opposite sides of this interruption 389. A wire 390 leads from the module 382 towards the negative terminal of the coil 309, but is interrupted at 391 and the two wires 367 and 368 are tapped into the wire 390 at respective opposite sides of the interruption 391. A fuel flow inhibiting valve 315 is connected between earth and the wire 372. A mercury tilt switch 331 and a siren 332 and the device 380 are connected between earth and the wire 362. A plurality of relay coils, such as 392 and 393 are connected between earth and the wire 373 and serve to operate respective relay switches, such as 394 and 395, interposed in the supply lines, such as 396 and 397, of accessories unrelated to the anti-theft purpose, such as the headlamps 398. Extra "dud" wires 399 to earth are provided.

The wires are made into a loom or looms wherever reasonably possible. For example, FIG. 11 shows a cross-section through such a loom at a location where there are twenty-one wires, each wire consisting of its conductor encased in a plastics or rubber sheath for electrical insulation purposes, the bundle of wires being encased in an outer sheath 400 which may consist of insulating tape wrapped around the bundle. The presence of the "dud" earthed wires such as 363, 364, 369 and 399 in the loom, combined with the hidden interruptions such as 387, 389 and 391 in the loom make it extremely difficult for a thief to work out which wires have any operating function and what those individual functions are.

Figure 12:
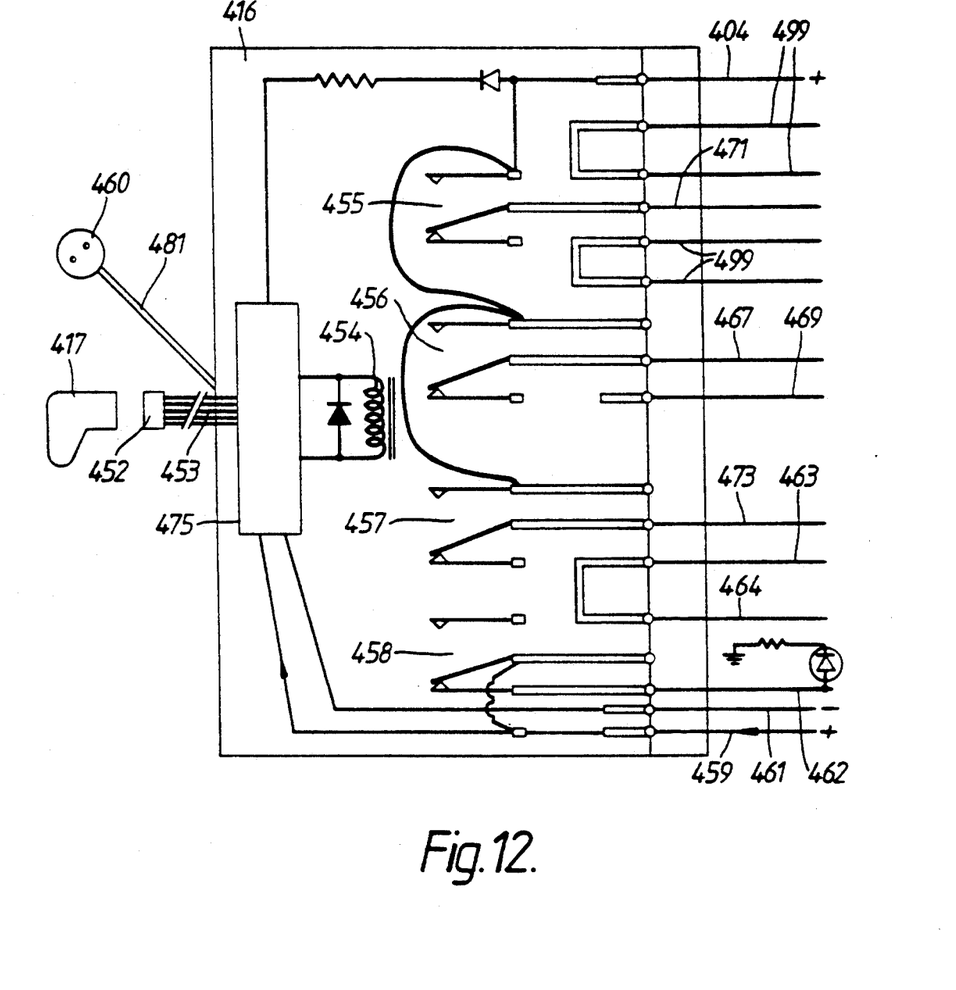
FIG. 12 is a diagram similar to FIG. 1, but of a yet further modified version of the anti-theft device suited to a Diesel-engined motor vehicle.

Referring to FIG. 12, the items 404, 416, 417, 452 to 464, 469, 473 and 499 correspond to the respective items 304, 316, 317, 352 to 364, 369, 373 and 399 in FIG. 9. However, in the present version, the wire 471 is utilised to operate a solenoid valve controlling the supply of Diesel fuel to the engine, and the wire 467 is used to power heaters and injector units.

Figures 13, 14:
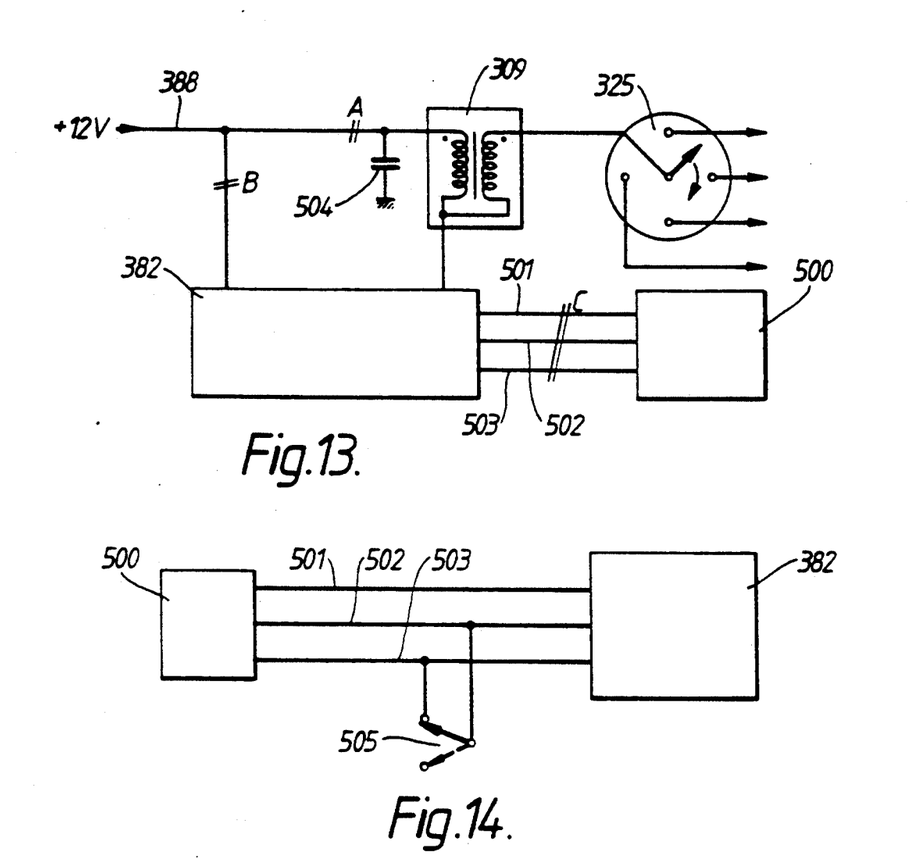
FIG. 13 shows diagrammatically a modification of the further modified version of the anti-theft device.
FIG. 14 shows diagrammatically another modification of the further modified version of the anti-theft device.

Referring to FIG. 13, in addition to the ignition coil 309, the distributor 325 and the electronic ignition module 382, there are shown an electronic sensor 500 connected by conductors 501, 502 and 503 to the module 382 for transmitting to the module 382 information signals as to states of the engine 378, and a suppressive capacitor 504. The Figure illustrates diagrammatically at A, B and C, respectively, that the input of the module 382, the input of the coil 309, and/or at least one of the conductors 501 to 503 can be formed with one or more interruptions, i.e. discontinuities, at which can be tapped-in pairs of conductors connected to one or more relay contact sets at the main portion 316.

In the modification shown in FIG. 14, the sensor 500 is a crank angle sensor and the earth and negative conductors 502 and 503 are short-circuited by way of a relay contact set 505 at the main portion 316 until the key 317 is inserted.

Figure 15:
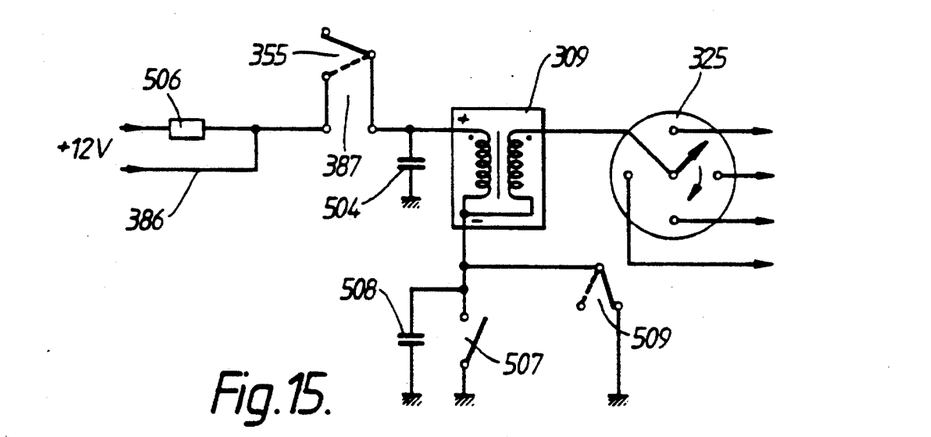
FIG. 15 shows diagrammatically a third modification of the anti-theft device.

The modification shown in FIG. 15 relates to a conventional ignition, with the coil 309, the distributor 325, the suppressive capacitor 504, a ballast resistor 506, an earthed circuit breaker 507 and an earthed breaker capacitor 508. Here, the negative side of the coild 309, at a location between the breaker circuit and the coil, is connected to earth by way of a relay contact set 509 at the main portion 316, until the key 317 is inserted. In this way, any thief connecting a jump lead between the battery and coil positive terminals will short the battery to earth and may burn out the jump lead.

The electromechanical relays illustrated in the various Figures can of course be replaced by electronic relays.

Instead of the driver being required to carry at least two keys, namely the electrical key 17, 117, 217, 317, or 417, and the mechanical door and/or ignition key(s), it may be feasible for the electrical key and the mechanical key to be combined into one key capable of "unlocking" both mechanically and electrically. the drawings appear to have the following advantages:

1. They cannot be hot-wired from inside the driver's compartment nor started from inside the engine compartment 2. Even if a thief has a duplicate set of mechanical ignition keys, the car cannot be stolen.

3. The device is not affected by outside influences such as radio waves on all bands, sonic waves, white noise etc., 4. The device cannot arm or disarm itself without the owner's instruction. Many known anti-theft devices have this problem because they are based on radio, sonic waves or infra red.

5.The device, when installed in any car or lorry, does not interfere with operation by an authorized user of any onboard computer systems, electronic engine management systems or others of the vehicle's electronics.

6. If the device is damaged, destroyed or removed, the car cannot be started.

7. If the loom is cut the car cannot be started.

8. The only thing that will readily enable starting of the car is the anti-theft key.

9. It is virtually impossible for a thief to copy, duplicate or make a master of the key as the thief would never know the circuit configuration of the system.

10. On test, the device was not affected by:
a) Electrical surges or impulses.
b) Humidity.
c) Dust.
d) Water.
e) Salt.
f) Vibration.
g) Shock.
h) Bombardment by radio or sonic waves.
i) Extreme heat or cold.

11. The device does not require an independent power supply to retain its electronic security coding. Accordingly, there is no chance of the individual code being lost or erased, and as the code is electronic and not written, not even the owner has it, whereby total security is observed.

12. The device cannot be successfully tampered with, examined or x-rayed and even if the thief knew the principles of the circuit, it would not matter. If he tried to use his knowledge of the circuit, he would not know which of the hundreds of thousands of electronic wiring combinations he was up against and there is no way from the device that he would be able to tell. Accordingly, the device virtually cannot be by-passed or beaten.

13. The device is cheaper to produce than the more complex of the anti-theft devices on the market.

Figure 8:
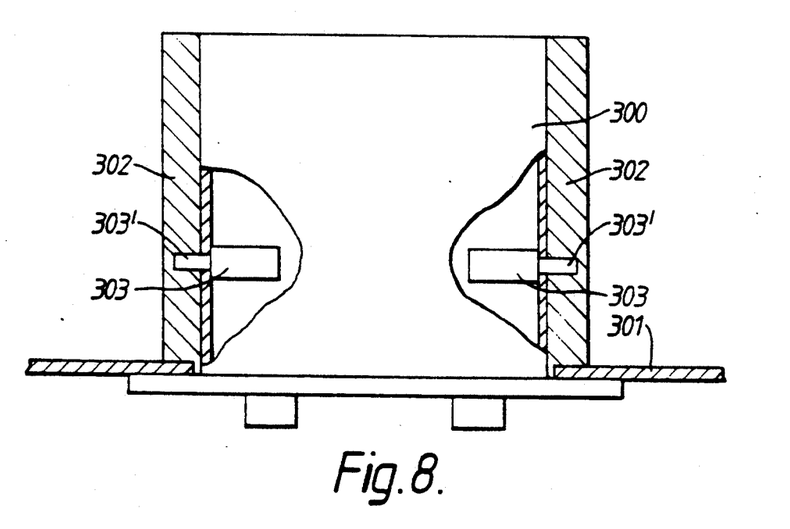
FIG. 8 shows a diagrammatic, sectional plan view of a wireless held in its mounting aperture in the dashboard of a motor vehicle.

The present device is also applicable, additionally or alternatively to preventing engine-starting, to other security purposes, for example to holding a vehicle or other door closed and to holding a wireless or a cassette player in its mounting aperture in a vehicle. FIG. 8 illustrates a wireless 300 received in its mounting aperture in a dashboard 301 of a vehicle, between firmly fixed metal mounting plates 302. The wireless 300 has firmly incorporated therein respective solenoids 303 the armatures 303' of which are engaged in respective blind bores in the plates 302. The coils of the solenoids 303 are energisable following insertion of the correct electrical key and switching on of the ignition, to withdraw the armatures 303' to allow removal of the wireless from its mounting aperture.

This arrangement has the advantages that the wireless can be installed virtually as easily as is conventionally the case yet a thief has a very great problem in removing the wireless without significantly damaging it and thus making it unsaleable.

We claim:

1. A security system, comprising electrical control circuitry, a plurality of electrical devices connectible to said control circuitry for operation thereby, electrical conductors, said system having an interruption location, at least one conductor being included in said control circuitry and extending to and terminating at said interruption location, other conductors extending from said interruption location to said electrical devices, said other conductors providing a plurality of electrical control paths to said electrical devices respectively, secure control means usable at said location for connecting said at least one conductor to said other conductors individually, one or more further electrical conductors having no operating function being arranged among at least some of the first-mentioned conductors in the manner of a wiring loom, at least one of said electrical conductors having a discontinuity therein, and tapped-in conductors connected to respective opposite sides of said discontinuity and extending in and along said loom.

2. A system according to claim 1, wherein at least one of said tapped-in conductors extends from a discontinuity to said interruption location.

3. A system according to claim 1, and further comprising relay means having driving means and a plurality of individual switching means openable and closable by energization and de-energization of said driving means, any one of said electrical devices being operatively connectible to any one of all of said individual switching means operable by said driving means.

4. A system according to claim 1, and further comprising comprising secondary electrical circuitry and accessories electrically connected to said secondary electrical circuitry for operation thereby, said secondary electrical circuitry including a supply line separate from any supply line of said electrical control circuitry, and said electrical devices including relay means interposed between said interruption location and said secondary electrical circuitry and operative upon use of said secure control means to close said secondary electrical circuitry.

5. A system according to claim 1, wherein said electrical devices include an ignition coil for an engine and having a positive side and a negative side, a first conductor extending from said negative side to said interruption location and a second conductor extending from said interruption location to earth, the aforsaid use of said secure control means at said interruption location serving to disconnect said second conductor electrically from said first conductor.

6. A system according to claim 1, wherein said electrical devices include an electronic device for controlling an engine, said system including sensing means for sensing states of said engine, and conductor means extending between said interruption location and said sensing means and between said interruption location and said electronic device, the aforesaid use of said secure control means at said interruption location enabling said sensing means to transmit signals to said electronic device by way of said conductor means.

7. A system according to claim 6, wherein said conductor means is short-circuited until the aforesaid use of said secure control means.

8. A system according to claim 6, wherein said conductor means is in an electrically broken condition until the aforesaid use of said secure control means.

9. A security system, comprising electrical control circuitry, an interruption location, a plurality of electrical devices connectible to said control circuitry for operation thereby, electrical conductors, at least one such conductor being included in said control circuitry and extending to said interruption location where it terminates, other conductors extending from said interruption location to said electrical devices, key type control means usable at said location to connect said at least one conductor to another conductor for enabling operation of at least some of the electrical devices, at least some of said first-mentioned conductors having a discontinuity therein, and tapped-in conductors connected to respective opposite sides of said discontinuity and being arranged among at least some of the first-mentioned conductors in the manner of wiring loom with at least one of said tapped-in conductors extending from said discontinuity to said interruption locations so that the security of the system is enhanced.

10. A vehicle security system, comprising principal electrical circuitry that has an open circuit, control means for completing the open circuit and rendering said principal electrical circuitry ineffective as security, secondary electrical circuitry, a signaling device for indicating an attempted breach of security, said device being electrically connected to said secondary electrical circuitry for operation thereby, and relay means interposed between said principal electrical circuitry and said secondary electrical circuitry and operable upon completion of said principal electrical circuitry; characterized in that there are first and second supply lines for said principal electrical circuitry and for said secondary electrical circuitry respectively, and a plurality of accessories electrically connected to said relay means by way of said secondary electrical circuitry.

11. A system according to claim 10, and further comprising electrical devices connected to said principal electrical circuitry for operation thereby, said electrical devices serving to control an engine of a vehicle.

12. A security system comprising electrical control circuitry, relay means comprising driving means, a plurality of individual switching means openable and closable by energization and de-energization of said driving means, and a plurality of electrical devices connectible to said individual switching means, any one of said plurality of said electrical devices operatively connectible to any one of all of the individual switching means operable by said driving means.

13. A vehicle security system comprising an electronic device for controlling an engine, an interruption location, starting control means usable to start said engine, sensing means for sensing states of said engine, and conductor means extending between said sensing means and said electronic device, said conductor means extending between said sensing means and said electronic device by way of said interruption location, secure control means being usable at said location to enable said sensing means to transmit signals to said electronic device by way of said conductor means thereby to enable said starting control means to start said engine, said secure control means being the only secure control means required to be used to enable said starting control means to start said engine.

14. A system according to claim 13, wherein said conductor means is short-circuited until the aforesaid use of said secure control means.

15. A system according to claim 13, wherein said conductor means is in an electrically broken condition until the aforesaid use of said secure control means.

* * * * *